United States Patent
Drummer

[19]

[11] Patent Number: 5,853,161
[45] Date of Patent: Dec. 29, 1998

[54] SOLENOID VALVE FOR CONTROLLING PRESSURE MEDIUMS

[75] Inventor: Eugen Drummer, Steyr, Austria

[73] Assignee: Robert Bosch GmbH, Stuttgart, Germany

[21] Appl. No.: 809,649

[22] PCT Filed: Apr. 1, 1996

[86] PCT No.: PCT/DE96/00566

§ 371 Date: Mar. 26, 1997

§ 102(e) Date: Mar. 26, 1997

[87] PCT Pub. No.: WO97/08480

PCT Pub. Date: Mar. 6, 1996

[30] Foreign Application Priority Data

Aug. 26, 1995 [DE] Germany .................... 195 31 394.1

[51] Int. Cl.⁶ .................................................. F16K 31/06
[52] U.S. Cl. ................................... 251/129.01; 251/359
[58] Field of Search ..................... 251/129.01, 30.02, 251/30.01, 129.15, 359

[56] References Cited

U.S. PATENT DOCUMENTS 4,409,638  10/1983  Sturman et al. ............... 251/30.02 X
4,643,393  2/1987  Kosugi et al. ............... 251/129.01

FOREIGN PATENT DOCUMENTS 2236137  1/1974  Germany .

Primary Examiner—Kevin Lee
Attorney, Agent, or Firm—Edwin E. Greigg; Ronald E. Greigg

[57] ABSTRACT

A solenoid valve which includes a valve member that has a flat sealing face which is on a face end that cooperates with a valve seat formed on a seat element that is embodied as spherical. The valve seat encompasses the outflow of a pressure conduit in the seat element. Because of the spherical nature, when the solenoid valve is put into operation, the seat face can increase in size by means of deformation of the seat region immediately adjoining the outflow of the pressure conduit. The seat region leads to a high degree of seat precision, which compensates for manufacture tolerances, combined with a high degree of high pressure tightness of the valve.

2 Claims, 1 Drawing Sheet

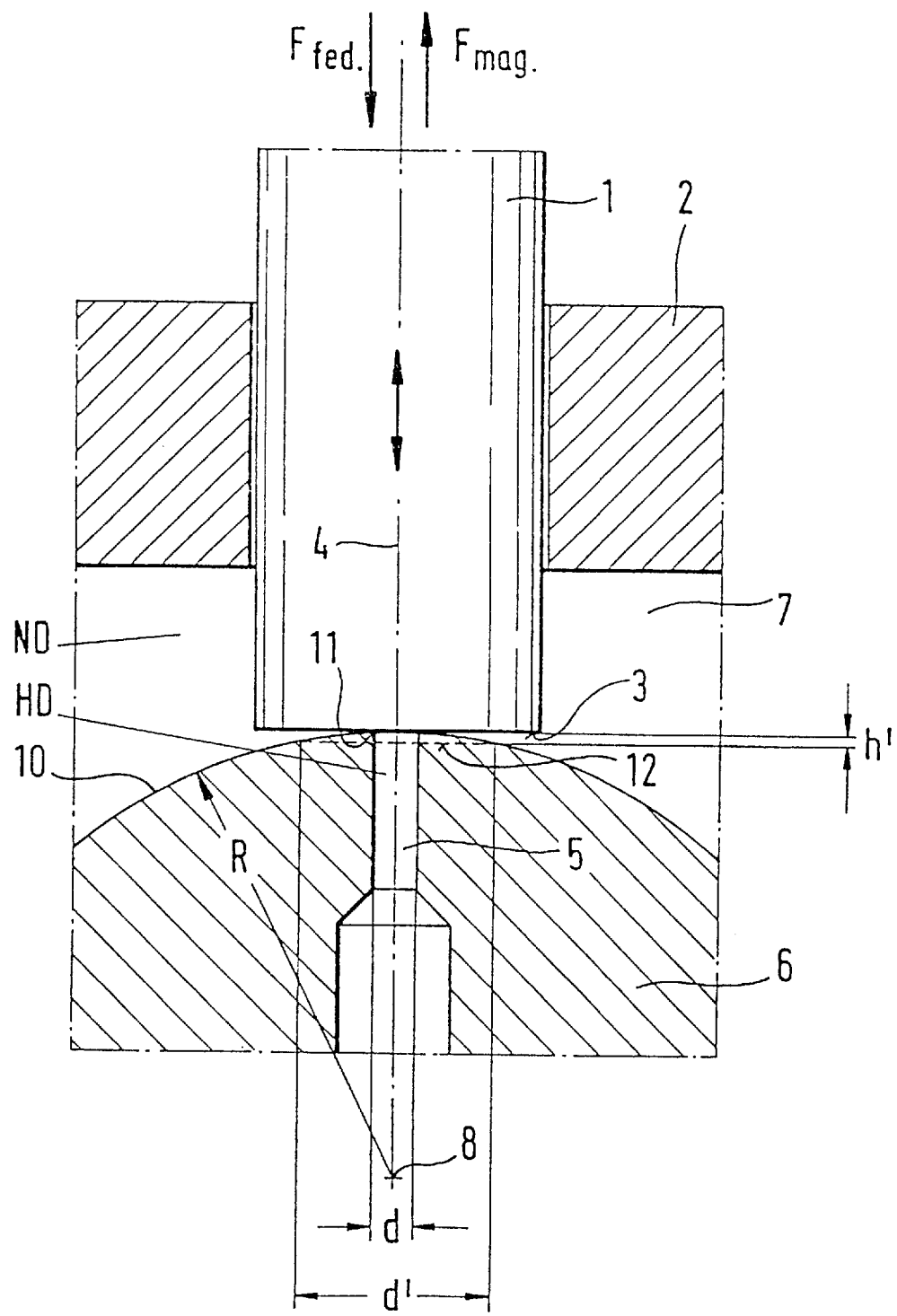

SOLENOID VALVE FOR CONTROLLING PRESSURE MEDIUMS

PRIOR ART

The invention relates to a solenoid valve for controlling pressure mediums. EP-A2-0 331 200 discloses a solenoid valve of this kind in which the valve seat is embodied as a flat seat, which cooperates with a flat sealing face on the end face of the valve member. The valve member is acted upon in the closing direction by a compression spring and is actuated in the opening direction by an armature when the electromagnet is excited. This embodiment has the disadvantage that it is problematic to obtain a high pressure tight pairing of sealing face and valve seat. To this end, the surfaces involved must lie parallel in a highly precise manner. Above all, when high pressure prevails on the valve member end in the chamber adjoining it, and low pressure prevails in the pressure conduit, it is essential that leakages do not additionally result in an application of force on the valve member in the opening direction.

ADVANTAGES OF THE INVENTION

The solenoid valve according to the invention, achieves an embodiment in which a highly precise sealed fit is produced between the valve member and its seat face on the spherical cap at the edge of the outflow of the pressure conduit. Because of the small support area of the valve member on its seat, high surface pressures occur here. In the course of the operation of the solenoid valve, due to the high surface pressure on the seat, it can arise that the seat, which is sharp-edged for the time being, deforms into an annular flattening in the region of the outflow of the pressure conduit. But this is always disposed in a very precise manner, parallel to the sealing face on the end face of the valve member so that a long lasting tightness is assured. This represents a significant improvement over the embodiment according to the prior art, where in the course of the operation of the solenoid valve, in the possible impact of the valve seat into the body that contains it, the material cannot easily flow or deform. There is the danger here that a leakage of the valve will occur in the closed position. As set forth herein, the valve member is moved against the seat by the action of a closing spring in such a way that the valve member can also follow deformations of the valve seat.

The solenoid valve according to the invention can be advantageously used in particular for controlling high pressures such as fuel injection pressures of over 1000 bar.

BRIEF DESCRIPTION OF THE DRAWINGS

The drawing shows a cross-sectional view of essential features of an exemplary embodiment of the invention which is explained in detail in the following description.

DESCRIPTION OF THE EXEMPLARY EMBODIMENT

The drawing shows only the part of a solenoid valve that is essential to the invention, in the form of the valve movable member 1, which is moved upward by an electromagnet force $F_{mag}$, not shown, and is moved downward by a spring force $F_{ed}$, not shown, corresponding to the arrows marked in the drawing. The valve member is guided in a housing 2 and has an end face 3 that is disposed perpendicular to the longitudial axis of the valve member. The sealing face of the valve is realized on this end face. Coaxial to the longitudial axis 4, opposite the end face of the valve member, a pressure conduit 5 emerges from a seat element 6 in a chamber 7. This chamber can be exposed, for example, to a low pressure and can correspondingly communicate with a discharge line. In contrast, a high pressure can prevail in the pressure conduit 5 and is discharged to the chamber 7 when the valve is open.

Toward the chamber 7, the seat element is embodied in the shape of a ball or spherical cap and in particular in the region of the outflow of the pressure conduit 5, has the shape of a spherical cap whose sphere center point 8 is disposed on the axis 4 shared by the valve member 1 and the pressure conduit 5. Consequently, a sharp edge 11 is formed on the spherical surface 10, at the outflow of the pressure conduit, against which edge the sealing face 3 of the valve member comes into sealing contact in its closed position. High surface pressures are produced here, which assure a high degree of tightness. Due to the high surface pressure, the material parts at the sharp edge 11 can deform somewhat in the course of the solenoid valve operation. The deformation then follows the shape of the sealing face precisely. An imaginary final state of the deformation on the seat element 6 is achieved, which is represented in slightly exaggerated form by the dashed line 12. The sealing face increases to the annular face produced by means of the diameter d' minus the area determined from the diameter d. This face is disposed in a highly precise manner, parallel to the sealing face so that at still higher closing pressures, a very favorable tightness of the valve is achieved. The embodiment of the seat element offers the advantage that deforming material can easily move toward the side away from the pressure conduit.

The tightness of the valve is also assured when the diameter of the valve member in the region of its sealing face 3 is greater than the contact face of the valve seat 12 produced after a few hours of operation since low pressure already prevails in the chamber 7, which corresponds to the pressure prevailing on the other end of the valve member. Consequently, the pressures in chamber 7 do not exert any forces in the opening direction.

With the embodiment of the solenoid valve given here, a sealing face that is the smallest possible contact area can be achieved with higher precision of the face association of the valve seat 12 with the sealing face 3. Since the area of the valve seat increases with growing deformation, the average force exertion per unit area becomes slight over time so that from a particular state onward, no further plastic deformations occur due to the force effect of the valve member that is moved downward via the closing spring. On the other hand, small deviations from manufacture tolerances are compensated for very rapidly with the deformation, resulting in a high degree of high pressure tightness of the valve.

The foregoing relates to preferred exemplary embodiments of the invention, it being understood that other variants and embodiments thereof are possible within the spirit and scope of the invention, the latter being defined by the appended claims.

What is claimed as new and desired to be secured by Letters Patent of the United States is:

1. A solenoid valve for controlling pressure mediums, which comprises a valve member (1) which is actuated along a longitudinal axis by an electromagnet and, said valve member includes a flat end face (3) as a sealing face, said flat end face cooperates with a valve seat (12) to which a pressure conduit (5) feeds, said pressure conduit is disposed coaxial to the longitudinal axis (4) of the valve member (1), the pressure conduit (5) emerges at a seat element (6), said seat element (6) includes a surface oriented toward the valve member which is formed as part of a spherical cap with an imaginary spherical center point (8) which is disposed on the longitudinal axis of the pressure conduit (5), said pressure conduit includes an outlet coaxial to the axis (4) of the valve member and constitutes a portion of the valve seat (12) at the outflow of the pressure conduit.

2. The solenoid valve according to claim 1, in which the valve member (1) is moved against the valve seat (12) by a force of a closing spring and is lifted from the valve seat (12) by a force of a magnetic force of an electromagnet.

* * * * *